United States Patent [19]

Schelen et al.

[11] Patent Number: 5,341,219

[45] Date of Patent: Aug. 23, 1994

[54] DEVICE AND METHOD FOR CONTROLLING THE CONTRAST IN AN IMAGE OBSERVATION SYSTEM PROVIDED WITH AN MCP IMAGE INTENSIFIER

[75] Inventors: Johannes B. J. Schelen, NR Den Haag; J. van den Berg, AD Pijnacker, both of Netherlands

[73] Assignee: B.V. Optische Industrie "De Oude Delft", Delft, Netherlands

[21] Appl. No.: 940,898

[22] PCT Filed: Apr. 17, 1991

[86] PCT No.: PCT/EP91/00736

§ 371 Date: Nov. 16, 1992

§ 102(e) Date: Nov. 16, 1992

[87] PCT Pub. No.: WO91/16787

PCT Pub. Date: Oct. 31, 1991

[30] Foreign Application Priority Data

Apr. 18, 1990 [NL] Netherlands ................ 9000915

[51] Int. Cl.⁵ .................... H04N 5/225; H04N 5/57
[52] U.S. Cl. ........................ 348/217; 348/255; 348/673; 348/678
[58] Field of Search ............... 358/209, 211, 169, 219, 358/174

[56] References Cited

U.S. PATENT DOCUMENTS

| | | | |
|---|---|---|---|
| 3,691,302 | 9/1972 | Gaebele et al. | 358/211 |
| 3,823,263 | 7/1974 | Guppy | 358/174 |
| 3,848,085 | 11/1974 | Van Atta | 358/211 |

Primary Examiner—Joseph Mancuso
Assistant Examiner—Wendy R. Greening
Attorney, Agent, or Firm—Louis E. Marn

[57] ABSTRACT

A device for determining a control signal for an image observation system including an image intensifier and an image converter wherein the control signal is representative of the contrast range of an output signal of the image converter and with control elements for adjusting the gain of the image intensifier and the gain of the image converter in a manner whereby the control signal at a value representative of a large contrast range in the output of signal of the converter results in higher adjustment gain of the image intensifier and a lower adjustment gain to the image converter and where the control signal at a value representative of a low contrast range in the output signal of the image converter results in lower adjustment gain to the image intensifier and higher adjustment gain to the image converter.

10 Claims, 4 Drawing Sheets

DEVICE AND METHOD FOR CONTROLLING THE CONTRAST IN AN IMAGE OBSERVATION SYSTEM PROVIDED WITH AN MCP IMAGE INTENSIFIER

BACKGROUND OF THE INVENTION

1. Field of the Invention

The invention relates to a device and method for controlling the contrast in an image observation system comprising an image intensifier provided with a microchannel plate and an image converter which converts the output image of the image intensifier into a video signal or a visible image.

2. Brief Description of the Prior Art

Such systems are already known and an image intensifier intended for use in such a system and having a microchannel plate, hereinafter called an MCP for brevity, is disclosed, for example, in "Microchannel Plates" Mullard Technical publication M81-0151, Mullard, Redhill, Surrey, GB and in "Image Tubes" by Illes P. Csorba, Howard W. Sams and Co. Inc. (1985), Indianapolis, U.S.A. The converter may, for example, be a CCD (charge coupled device) with associated read-out electronics which delivers a video signal for display on a video screen and which, for example, observes the image of the image intensifier via an optical fibre plate or relay optics. Such a system, which therefore forms a television camera system having an image intensifier placed in front of the actual imaging device is in fact called a "low light level television camera" and will therefore hereinafter be called an LLLTV camera for the sake of brevity. The image converter may, however, also be, for example, an optical system (for example, a magnifying glass) or an additional image intensifier in a night viewer.

A drawback of the known systems is that the contrast control they contain is not adequate in those cases in which a dark scene is observed in which one or more bright points, so-called bright spots, are present. Existing contrast control systems are, in fact, based on the average brightness and in such a case they therefore attempt to keep the average brightness constant, as a result of which the dark scene portions, which often contain the information of interest to an observer, become still darker, and this is precisely what is undesirable. In addition, in the case of a video signal, the existing contrast control system is designed to adjust back the brightness in the event of bright peaks in the video signal, regardless of the average brightness, and this only increases the problem outlined.

SUMMARY OF THE INVENTION

The object of the invention is to offer a solution to this problem and for this purpose, it provides a device of the abovementioned type which is provided with means for determining a control signal which is representative of the contrast range in the output signal of the converter and with means of controlling the gain of the image intensifier and the gain of the image converter in a manner such that, if the control signal has a first value which is representative of a large contrast range in the output signal of the converter, the gain of the image intensifier is high and that of the image converter is low, and if the control signal has a second value which is representative of a low contrast range in the output signal of the converter, the gain of the image intensifier is low and that of the image converter is high.

The invention also provides a method in which the voltage applied across the microchannel plate is increased and the gain of the image converter is reduced if the image formed by the image converter has a large contrast range and in which the voltage applied across the microchannel plate is reduced and the gain of the image converter is increased if the image formed by the image converter has a low contrast range.

The measures according to the invention make it possible, in the manner to be explained in more detail below, to control the contrast of the image formed by the converter on the basis of a dark portion or the darkest portion in the observed scene, the brighter spots in the scene, which can already often be observed even without which image intensifier, not affecting the total gain and said brighter spots not adversely affecting the image quality for the others.

BRIEF DESCRIPTION OF THE DRAWINGS

The invention will be explained below in more detail on the basis of an exemplary embodiment, with reference to the drawing, in which.

DETAILED DESCRIPTION OF THE INVENTION

An MCP image intensifier is a vacuum tube, of which one side, which receives the image to be intensified, forms a photocathode and of which the oppositely situated side forms the anode. The MCP placed inbetween is composed of a large number of hollow glass fibres which are coated on the inside with a semiconducting layer which is capable of providing electron multiplication. All the said fibres are connected to a voltage, as a result of which there arises in the channel a longitudinal electric field which provides the mechanism of secondary emission with energy.

The principle of an MCP is based on the multiplication of the electrons originating from the photocathode, which receives the image to be intensified, by means of secondary emission.

The gain of every channel is individually primarily dependent on the strength of the longitudinal electric field in the channel and is consequently dependent on the applied voltage.

Figure 1A:
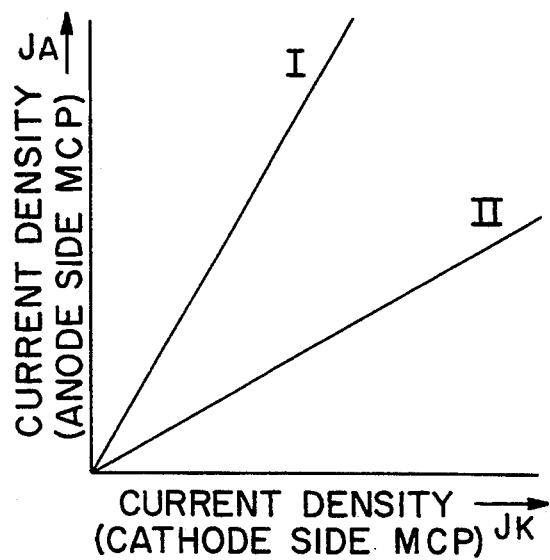
FIGS. 1a, b, c show three diagrams for the purpose of explaining the behaviour of a microchannel plate for various MCP voltages and MCP impedances.
Figure 1B:
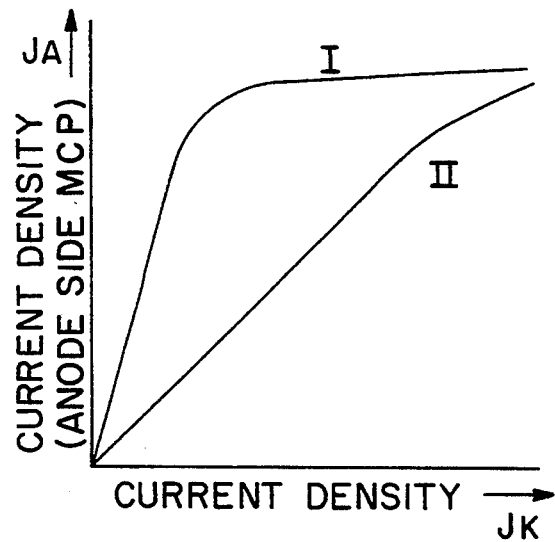
Figure 1C:
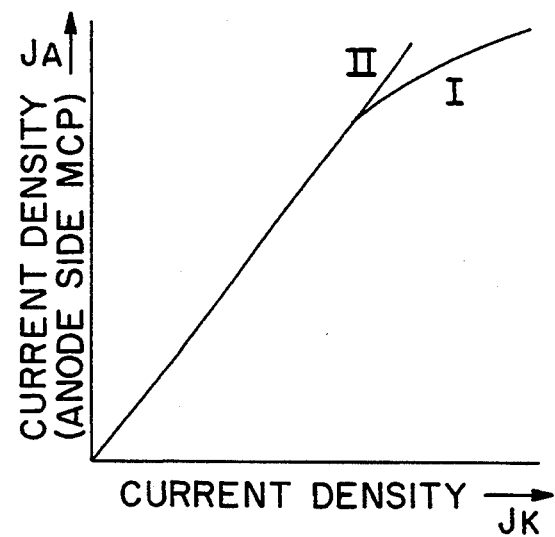

If the number of secondary electrons generated is small compared with the current which flows through the semiconducting layer of the channel (the so-called standing current or, alternatively, strip current), the voltage gradient across said layer will remain unchanged. If, however, the number of secondary electrons generated increases to such an extent that the output current approaches the strip current, the voltage gradient, and consequently the longitudinal electric field in the channel will decrease. This has the result that the gain, i.e. the multiplication of electrons, starts to decrease. This phenomenon is called channel saturation and results in a nonlinear gain of the channel in the MCP. In general, it may be stated that the gain of an MCP is linear provided that the output current at the anode side of the MCP is less than approximately 10% of the strip current. It will be clear that the gain may decrease not only as a result of a large input signal but also as a result of the impedance of the conductive layer. After all, the higher this impedance, the lower the strip current and consequently, the level of the input signal at which channel saturation starts to occur. For the relationship between gain and input current, MCP impedance and MCP voltage, reference is made to FIG. 1. In FIGS. 1a, b and c, the current density $J_k$ supplied to the input/the cathode side of an MCP is plotted along the horizontal axis, while the anode current density $J_a$ obtained at the anode side of the MCP is plotted along the vertical axis. FIG. 1a shows this relationship for an MCP having a low impedance, curve I showing the relationship for a high voltage across the MCP and curve II showing it for a low voltage, a high or low voltage corresponding to a high or low gain factor, respectively, of the MCP. FIG. 1b shows, in an identical manner, the relationship between the cathode current density supplied and the anode current density for an MCP having a high impedance. Finally, FIG. 1c shows said relationship in the case where the MCP voltage is kept constant, curve I showing the relationship for a high MCP impedance and curve II showing the relationship for a low MCP impedance.

The invention is based on the insight that the effect described above, which is already known per se from the abovementioned literature references, can advantageously be used in combination with a correctly dimensioned gain control of the image converter, such as a CCD camera, a second image intensifier or an optical system to reduce the effect of "bright spots" on the contrast control of the LLLTV system or image intensifier.

Figure 2:
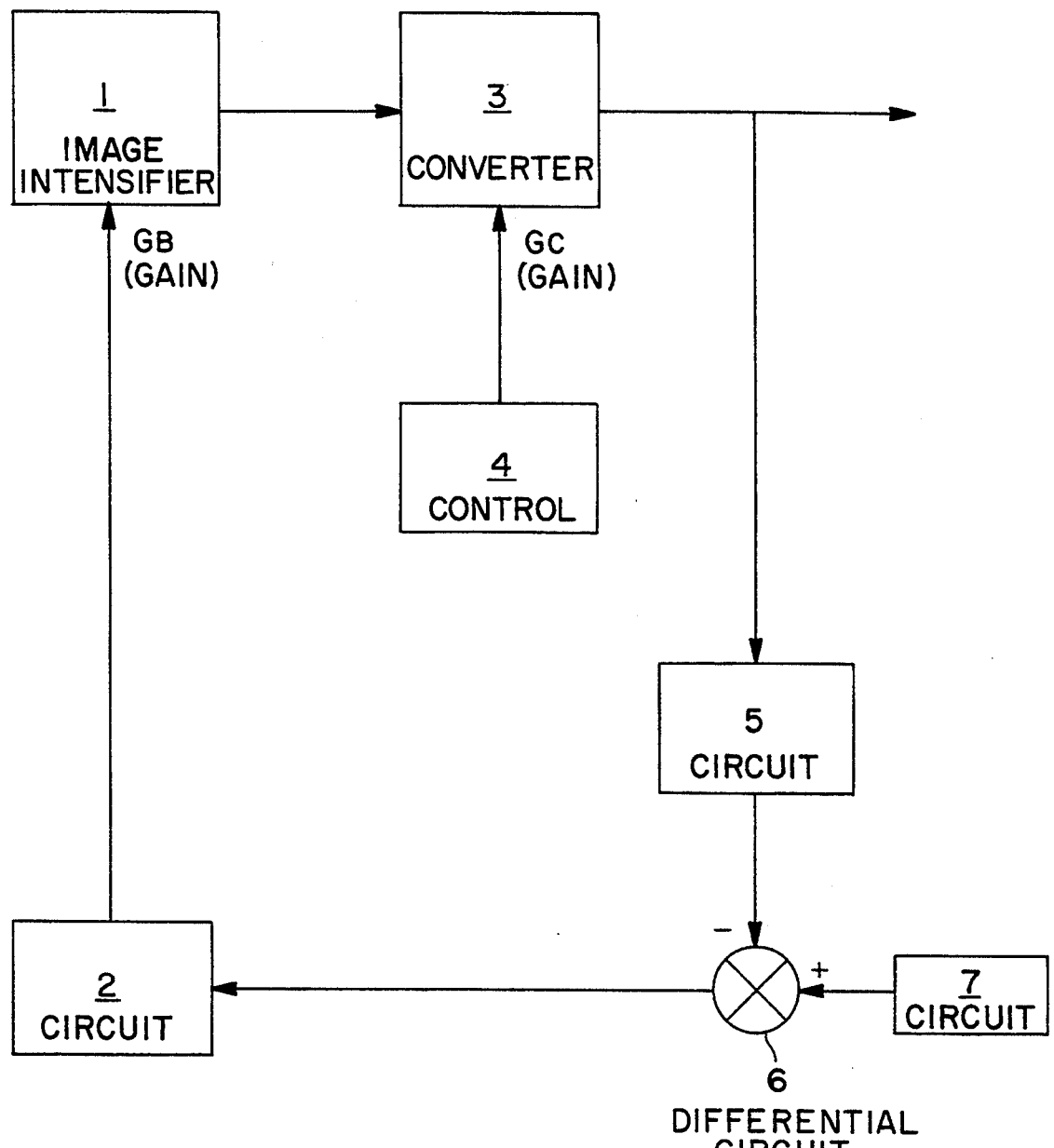
FIG. 2 shows a block diagram of a system in which the contrast control according to the invention can be used.

The image observation system shown in FIG. 2 comprises an image intensifier 1 provided with an MCP, a circuit 2 for controlling the gain $G_b$ of the MCP by controlling the high voltage to be applied across the MCP, a converter 3, which may, for example, be a camera having CCD pick-up system and provided with its own external control 4 for the gain $G_c$ thereof and having an output signal from which a visible image can be formed, for example, on a cathode ray tube. A circuit 5 is furthermore provided for measuring the signal strength of the entire electronic or optical image delivered by the converter 3. The output signal of circuit 5 is compared in a differential circuit 6 with a signal delivered by a circuit 7 which represents the brightness desired by an observer. The output signal of the differential circuit 6 is fed to the input of the control circuit 2.

Figure 4:
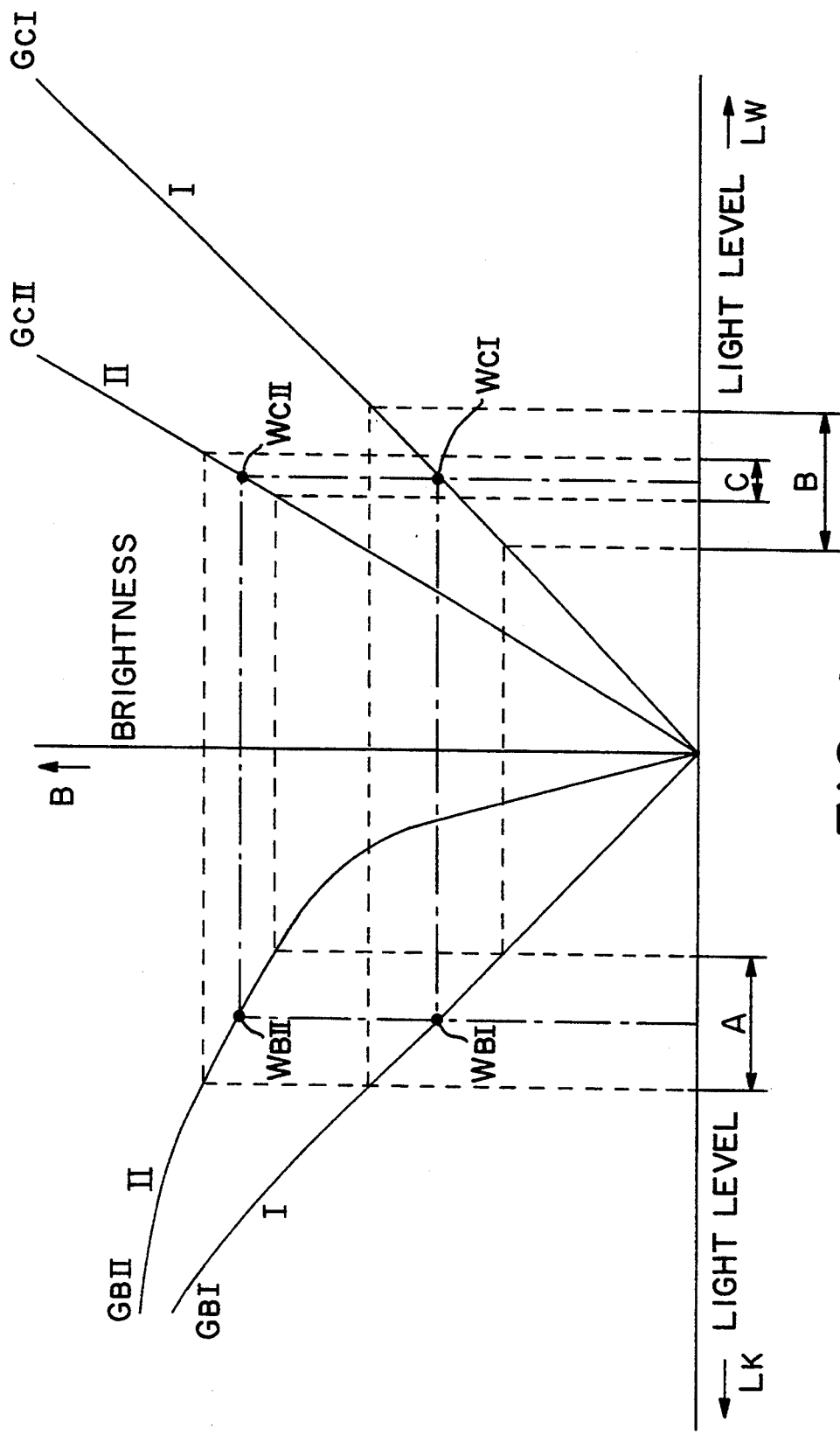
FIG. 4 shows a diagram that shows the relationship between the contrast range observed by an observer and the actual contrast range in the observed scene.

The operation of the contrast control according to the invention can best be explained on the basis of FIG. 4. In this figure, the brightness B of the image on the anode of the MCP image intensifier 1 is plotted along the vertical axis, while the amount of light $L_k$ from the scene to be observed received on the cathode of MCP image intensifier 1 is plotted along the horizontal axis in the left-hand quadrant, said quadrant in fact being identical to the diagram shown in FIG. 1b, an MCP having a high impedance also being used in FIG. 4 and curve II showing the relationship between the amount of light supplied and the anode brightness for a high voltage across the MCP, i.e. for a high gain factor $G_{BII}$ and curve I showing it for a low voltage, i.e. for a low gain factor $G_{BI}$. The right-hand quadrant of FIG. 4 shows, along the horizontal axis, the light level $L_w$ observed by the observer after the anode image of the image intensifier 1 has been converted by the converter 3 into a visible image. In this quadrant, curve I gives the relationship between the light level $L_w$ observed in the visible image by the observer and the brightness B of the image on the anode of the MCP image intensifier 1 in the case where the converter 3 has a high gain factor $G_{CI}$ and curve II gives the said relationship in the case where the converter 3 has a low gain factor $G_{CII}$.

If it is assumed that the converter 3 is set to the working point $W_{CI}$ with the gain control 4, which corresponds to a high gain $G_{CI}$, the measuring circuit 5 will control the setting of the image intensifier to the point $W_{BI}$ via the control circuit 2 for the MCP, which corresponds to the low gain $GB_I$. As soon as the control has reached the stable state, the total gain $G_{tot}$ is therefore given by:

$$G_{totI} = G_{CI} \times G_{BI}.$$

If the converter 3 is set, by means of the gain control 4, to the working point $W_{CII}$, which corresponds to a low gain $G_{CII}$, the measuring circuit 5 will control, via the controlling circuit 2, the setting of the image intensifier 1 to the point $W_{BII}$ which corresponds to the high gain $G_{BII}$. As soon as the control has reached the stable state, the total gain is then given by $$G_{totII} = G_{CII} \times G_{BII}.$$

It is true that $G_{totI} = G_{totII}$ because the control loop consisting of the circuits 5, 6 and 2 strives to keep the brightness of the image observed by the observer constant and equal to the desired brightness set with the circuit 7. However, as emerges clearly from FIG. 4, a contrast range A in the image presented, which contrast range is shown in the left-hand quadrant in this figure, results in different contrast ranges in the image observed by the observer as a consequence of the nonlinear curve I in the transmission of the MCP. If $G_{tot} = G_{CI} \times G_{BI}$ the observed contrast range, is equal to B, while B≈A, while if $G_{tot} = G_{CII} \times G_{BII}$, the observed contrast range is equal to C, where C<A.

It has been found that, to obtain an optimum contrast control, the MCP impedance has to be chosen so that the brightness B which is produced when the maximum value of the "strip current" occurs is approximately in the same order of magnitude as the maximum brightness $B_{max}$ which can be processed by the image intensifier/converter combination. For the image intensifier/CCD camera combination (if the CCD camera is coupled by means of fibre optics), the MCP impedance is around 2 Gigaohms.

In the case where the converter 3 is a night vision system, the principle underlying the invention can be applied by placing, behind the image intensifier 1 with the MCP, a continuously variable attenuator, for example in the form of two polarising filters which can be rotated in opposite directions of which the setting is mechanically coupled to the standard control present for the maximum image brightness of the system, such as the circuit 7 in FIG. 2. By controlling back the maximum image brightness, as in the case of "bright spots" in the observed scene, the attenuation as a consequence of the polarising filters then increases and, in order to keep the average brightness constant, the gain of the MCP is increased, which results in the contrast compression explained above without the average brightness changing substantially.

Figure 3:
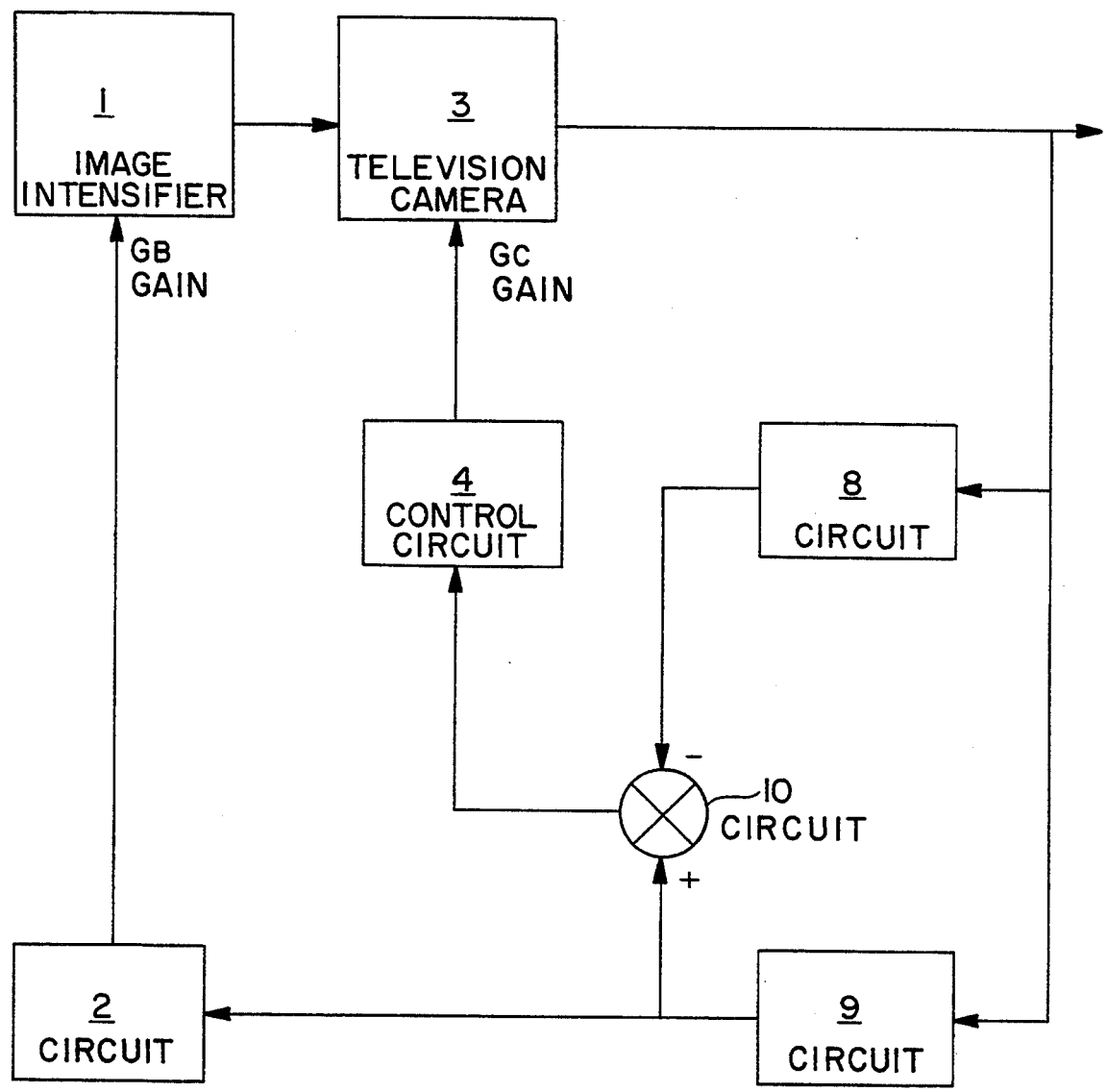
FIG. 3 shows a block diagram of an LLLTV system in which the contrast control according to the invention can be used.

FIG. 3 shows a variant of the block diagram of FIG. 2 for the case where the converter 3 is a television camera having, for example, a CCD image sensor, the system shown forming an LLLTV camera. In FIG. 3, identical components are indicated by the same reference numerals as in FIG. 2. In this exemplary embodiment, the video signal which is present at the output of the camera 3 is fed to a circuit 8 which determines the peak value of the video signal and to a circuit 9 which determines the average value of the video signal. The output signal of circuit 9 is fed directly to the voltage control circuit 2 for the MCP, while the difference between the output signals of the circuits 8 and 9 is determined in a differential circuit 10 and fed to the input of the circuit 4 to control the gain of the converter 3, i.e. the camera. In this way, the contrast range of the image presented, which is represented by the output signal of circuit 10, is used to adjust the gain of the camera, as a result of which, in the event of a large contrast range such as that due to the presence of "bright spots", the camera is, for example, set to the point $W_{CII}$ in FIG. 4 with a low gain, so that the MCP is set to a high gain, for example at the point $W_{BII}$ in FIG. 4, so that the total gain of the system remains constant but the contrast range in the image observed decreases with respect to the situation in which the measured contrast range is low and the camera is set to a high gain. In this way, an automatic contrast control is obtained which provides an optimum matching to the differences in the light levels in the scene and to any bright spots present.

It will be clear that, within the scope of the invention, a large number of variations is possible, in particular as regards the design of the measuring circuits 5, 8 and 9. Thus, more advanced measuring circuits than the average value measuring circuits 5 and 9 can be used. A possibility is to use, instead of the circuits 5 and 9, a circuit in order to assign every image point in the image of the converter 3 a weighting factor depending on its brightness and to use the sum of said weighting factors as an indication of the image brightness. Thus, a fixed brightness level can be chosen and then a weighting factor of +1, for example, is assigned to every image point having a brightness above said level and a weighting factor of −1, for example, is assigned to every image point having a brightness below said level. By now designing the control circuit 5 or 9 to strive for a number of image points having a weighting factor of +1 and that having a weighting factor of −1 to remain equal, it is already possible, in this way, to take account of the effect of "bright spots" better than with an average value control. A further improvement of the bright spot suppression can be obtained by assigning a weighting factor of less than +1 to image points having a brightness far above the fixed brightness level.

We claim:

1. A device for controlling contrast in an image observation system comprising an image intensifier provided with a microchannel plate and an image converter for converting an output image of the image intensifier into a video signal or a visible image, which comprises means for determining a control signal representative of a contrast range in an output signal of said image converter, means for adjusting gain of said image intensifier and means for adjusting gain of said image converter whereby if the control signal has a value representative of a larger contrast range in said output signal of said image converter, the gain of the image intensifier is adjusted higher and the gain of said image converter is adjusted lower, and whereby if the control signal has a value representative of a low contrast range in said output signal of said image converter, the gain of said image intensifier is adjusted lower and the gain of said image converter is adjusted higher.

2. The device to claim 1 wherein said microchannel plate is of high channel impedance.

3. The device according to claim 1 wherein said means for determining said control signal representative of the contrast range in the output signal of the converter determines a brightness distribution of said output signal.

4. The device according to claim 3 wherein said means for determining said control signal assigns a weighting factor to every image point in said output signal depending on a brightness level in said output signal and derives a control signal from a sum of said weighting factors.

5. The device according to claim 1 characterized in that said image converter is comprised of an imaging device converting an optical image into a video signal.

6. The device according to claim 5 wherein said imaging device comprises a CCD imaging device.

7. The device according to claim 1 wherein said image converter is an image intensifier.

8. The device according to claim 1 and further including a controllable optical attenuator positioned between said image intensifier and said image converter.

9. Method for controlling contrast in an image observation system comprising an image intensifier having a microchannel plate and an image converter converting an output image of said image intensifier into a video signal or a visible image, characterized in that voltage applied across said microchannel plate is increased and gain of said image converter is reduced if the image formed by said image converter is of a large contrast range, and wherein voltage applied across the microchannel plate is reduced and gain of said image converter is increased if the image formed by said image converter is of a low contrast range.

10. The method according to claim 9 wherein voltage applied across said microchannel plate in the case of a large contrast range is increased to an extent that a transmission of said microchannel plate is no longer linear.

* * * * *